3,048,029
GAS CHROMATOGRAPHIC ANALYSIS OF INORGANIC MATERIALS

Richard S. Juvet, Jr., 532 Fairlawn Drive, Urbana, Ill., and Francis M. Wachi, 127 La Verne Ave., Long Beach, Calif.
No Drawing. Filed Mar. 19, 1959, Ser. No. 800,361
7 Claims. (Cl. 73—23)

This invention relates to gas chromatography and, more particularly, it relates to an improved method for separating and analyzing volatile inorganic compounds by means of gas chromatography and to column packing materials used therein.

Gas chromatography is a relatively recent technique which is useful for the analysis and separation of mixtures of compounds which in some cases permits separations to be made which are not possible by other means. In general, gas chromatography involves a moving gaseous phase and a stationary phase which may be either solid or liquid. When the stationary phase is solid, the method is known as "adsorption" chromatography. When the stationary phase is liquid, the method is known as "partition" chromatography. It is with partition chromatography that this invention is concerned.

In carrying out a typical analysis or separation by partition chromatography, there is used an elongated packed column filled with a granular material having a surface coating of a partition liquid which is relatively nonvolatile in comparison to the sample to be analyzed. A stream of a preheated inert gas is established through the bed and the sample is injected into the stream of gas entering the column and is volatilized. The inert gas carries the constituents of the sample as vapor through the column at different speeds thereby causing these constituents to emerge from the column in more or less individual bands. The changing composition of the effluent gas is detected by a suitable detecting device which is capable of detecting the presence of the components of the sample qualitatively and/or quantitatively as desired.

The use of partition gas chromatography prior to this invention has been restricted to the analysis and separation of volatile organic substances or of low molecular weight, relatively inert inorganic gases such as nitrogen. The separation and determination of inorganic compounds which are normally solid or liquid have not been possible for several reasons. The boiling point of these inorganic compounds may be relatively high in order to maintain them in the gaseous phase, it may be necessary to operate the chromatographic column at temperatures more elevated than are used with most organic compounds. Moreover, the partition liquids which have heretofore been used either volatilize or decompose at elevated temperatures or react with the constituents of the inorganic sample being analyzed to form nonvolatile compounds within the column.

It has been discovered that partition gas chromatographic procedures may be applied to volatile inorganic compounds, such as the halides of the transition metals, by using as the stationary phase a bed of particles of a solid material which is inert at the temperatures employed, said particles being coated with a nonvolatile inorganic salt or a mixture, preferably a eutectic mixture, of such salts. In accordance with the invention, the operation is carried out at a temperature near the boiling point (at the operating pressure) of the highest boiling constituent of the sample mixture, said temperature being sufficiently high to melt the surface coating of salt or mixture of salts on the particles of the bed.

As above indicated, the partition liquid used in this invention comprises a fused inorganic salt or a fused mixture of inorganic salts. The partition liquid must be relatively nonvolatile at the temperature at which the column is operated. The operating temperature, however, must be above the melting point of the salt or mixture of salts and preferably within the range from about 20° to about 50° C. above the melting point. The temperature of operation of the column is an important operating variable. This temperature must be near the boiling point (preferably within 25° C.) of the highest boiling constituent of the sample mixture so as to maintain all components of the sample at a sufficiently high vapor pressure. Higher temperatures obviously permit a wider variety of sample mixtures, including constituents of higher boiling points, to be analyzed. However, the solubility of each constituent in the stationary phase is decreased as the temperature is raised so that the retention time in the column, and, more importantly, the difference in retention times for the various constituents (i.e., the time lag between the appearance of one constituent in the effluent from the column and the appearance therein of the next constituent) is decreased, thereby rendering the separation of the constituents more difficult. For these reasons, it is preferred to keep the column temperature only slightly above the melting point of the salt or salts used as the partition liquid and, as stated above, within the range from about 20° C. to about 50° C. above the melting point.

In certain instances, it may be found that a single inorganic salt which melts within the preferred temperature range is unavailable. In such instances, mixtures of inorganic salts can be used to bring the melting point within the desired range. Eutectic mixtures of these salts are frequently preferred under these conditions because of the relatively low melting point which such mixtures possess.

Although the method of the invention is applicable in theory to any stable substance which can exist in the form of a vapor, it is particularly suitable for the analysis and separation of inorganic compounds whose boiling points are relatively low, such as compounds of the transition metals, and particularly the halides thereof. These halides have boiling points which are relatively low for inorganic compounds and are thus particularly suitable for separation and analysis by the method of the invention. Examples of such compounds are (boiling point in parentheses): $GeCl_4$ (83.1° C.); $SnCl_4$ (114° C.); $CrO_2Cl_2$ (116° C.); $TiCl_4$ (136° C.); $AsCl_3$ (130° C.); $SbCl_3$ (225° C.); $AlBr_3$ (263° C.); $SbBr_3$ (280° C.); $BiBr_3$ (453° C.); $GaBr_3$ (279° C.); $GeBr_4$ (187° C.); $HgBr_2$ (322° C.); $TeBr_2$ (339° C.); $SiBr_4$ (153° C.); $TiBr_4$ (230° C.); $VF_5$ (111° C.); $UF_6$ (56° C.); $WF_6$ (20° C.); $TaF_5$ (230° C.); $ReF_6$ (48° C.); $MoF_6$ (35° C.); $OsF_6$ (205° C.); $OsF_8$ (47° C.); $SbF_5$ (150° C.); $BI_3$ (210° C.); $HgI_2$ (354° C.); $ZnI_2$ (624° C.).

As representative of the inorganic salts which can be used as the partition liquid in the method of the invention there may be mentioned the following salts and mixtures thereof:

| Components | Mole percent | Melting Point, ° C. |
|---|---|---|
| $AlCl_3/NaCl$ | 58.9/41.1 | 125 |
| $BiCl_3/PbCl_2$ | 89/11 | 215 |
| anh $ZnCl_2$ | 100 | 261 |
| $KCl/NaCl$ | 42.5/57.5 | 355 |
| $KCl/CdCl_2$ | 33/67 | 383 |
| $NaCl/LiCl$ | 28.5/71.5 | 552 |
| $BiBr_3/PbBr_2$ | 75/25 | 206 |
| $CdBr_2/KBr$ | 38/62 | 304 |
| $CdI_2/NaI$ | 52/48 | 287 |
| $CdI_2/KI$ | 52/48 | 185 |
| $KF/LiF/NaF$ | 45/45/10 | 454 |

Obviously, the salts given above and others which will occur to those skilled in the art can be used in different mixtures and in different proportions depending on the nature of the sample to be analyzed. In order to avoid insofar as possible any reaction between the partition liquid and the sample mixture, it is desirable to have the anions thereof identical. Thus, if the sample is a mixture of chlorides, for example, it is desirable to use as the partition liquid a chloride or a mixture of chlorides. In addition to not reacting irreversibly with either the sample mixture, the packing material or the column itself, the partition liquid must relatively non-volatile in comparison to the sample mixture and must possess differential solvent properties for the constituents of the sample mixture.

The requirements for the solid material used as the support for the partition liquid are relatively few. The solid should be inert to all other materials it encounters at the temperature of operation. It should not possess in itself adsorptive properties for sample constituents when coated with the partition liquid and it, of course, should be nonvolatile. Preferred examples of suitable solids for this purpose include "Celite" diatomaceous earth and Johns-Manville Sil-O-Cel C-22 firebrick. For use in the typical gas chromatographic column, the particle size of the support may suitably be the 30/50 or 50/80 ASTM screen fractions.

The stationary phase packing materials used in this invention contain the salt which functions as the partition liquid in an amount of about 20% to 70%, and preferably about 40% to 60%, by weight of the entire composition. The packing material is easily prepared by adding the inert granular material to the molten salt with agitation, followed by slow cooling to room temperature.

In carrying out the method of this invention, the procedures employed are, in general, identical with those used in partition gas chromatography as heretofore known. Thus, the dimensions of the column, the nature and flow rate of the inert carrier gas and the nature of the associated apparatus and equipment are all similar to those heretofore employed.

The internal diameter of the typical analytical gas chromatographic column is about 4–8 mm. Above this range the efficiency per unit length of the column drops off; below it, the difficulty of packing the column properly increases. Abnormally high column back pressures may be encountered if the particle size of the packing material is too small, i.e., below about the 50/80 ASTM screen fraction. Using particle sizes larger than about the 30/50 ASTM screen fraction may lead to channeling difficulties in the column and is, therefore, not recommended.

The column itself may be made of any inert material suitable for the conditions encountered. Preferred materials are Pyrex glass, vycor or quartz. In general, the glass-like materials are preferred over metals in order to reduce the possibility of reaction of the inorganic materials with the column itself.

Suitable column lengths range from about 3 to about 60 feet. In general, the efficiency of the column increases with increasing length, although not in a directly proportional manner, since as the column length increases other operating variables, such as the pressure and rate of flow, are also affected.

The gas used as the carrier in the column may be any gas which is inert to the materials encountered under the conditions of operation. The most commonly used gases are nitrogen, hydrogen and helium. The gas flow rate is not highly critical, there being found to exist a rather wide optimum gas flow range for a given set of operating conditions. Typical gas rates may range from about 10 to about 400 ml./minute, measured at the outlet of the column at the ambient temperature and pressure.

The sample to be analyzed may be introduces into the flowing gas stream in a number of ways, depending on the normal condition of the sample. Liquids may be introduced by a syringe through a rubber or silicone serum cap or by crushing a sealed ampoule within the column. Gases may be introduced by displacing a known volume from a calibrated chamber by the carrier gas. Solids may be heated to either the liquid or gaseous state and then handled in the customary manner for these materials. Alternatively, solids may be dissolved in an appropriate liquid solvent and injected with a syringe.

The detection of the components in the effluent from the column can be achieved in any appropriate manner, e.g., by detecting changes in the pressure differential developed across a restriction through which the carrier gas flows at constant rate or in the density of the effluent stream. The most widely used detection device is the thermal conductivity cell or katharometer, whose response varies with the amount and nature of the component. By suitable calibration, a katharometer can be used to give quantitative results.

The following example is given as an illustration of the operation of the method of invention.

*Example*

A run was made using a sample consisting of a mixture of $TiCl_4$ (B.P. 136° C.) and $SbCl_3$ (B.P. 225° C.). The sample, 25 μl. in size, was injected into a carrier stream of helium gas flowing at the rate of 40.3 ml./min. through a 12 ft. coiled column of Pyrex glass having an inner diameter of 4 mm. The column was packed with Sil-O-Cel C-22 (Johns-Manville Corp.) which had been ground to 30–60 mesh and evenly coated with a eutectic mixture of anhydrous $BiCl_3$ and $PbCl_2$ containing about 89 mole percent $BiCl_3$ and having a melting point of 217° C. The eutectic mixture constituted about 40% by weight of the total column packing material.

With the column operated at 225° C., it was found that the $TiCl_4$ was retained within the column for 5.3 minutes while the $SbCl_3$ was retained for 12.9 minutes. It is obvious that the column effected a separation between the components of the mixture which would enable an analysis thereof to be made.

Although in the above example, metal chlorides were used as both the sample mixture and as the partition liquid, the invention is by no means restricted thereto. Other compounds, and particularly other halides of the transition metals, may be analyzed using other molten salts and particularly other halides such as bromides, iodides, or fluorides as the molten salt partition liquid.

Although the method of the invention has been described primarily as an analytical technique, it is not restricted thereto. Thus, the principles of the method disclosed herein can be put to use on a larger scale than described herein for separating and/or purifying volatile inorganic compounds on a commercial or a semi-commercial scale.

The foregoing detailed description has been given for clearness and understanding only, and no unnecessary limitations should be understood therefrom, as modifications will be obvious to those skilled in the art.

What is claimed is:

1. The method of separating by partition chromatography the constiuents of a sample mixture comprising volatile metallic inorganic compounds which method comprises establishing a stream of a heated inert carrier gas through an elongated partition column packed with solid particles at an elevated temperature, said particles having a surface coating of a partition liquid comprising a molten eutectic mixture of a plurality of nonvolatile inorganic metal salts, said molten mixture being unreactive with the constituents of the mixture being separated, injecting said sample mixture into the stream of carrier gas entering said column, and detecting the appearance of volatilized constituents of said sample mixture in the effluent from said column.

2. The method of separating by partition chromatography the constituents of a sample mixture comprising volatile metal halides which method comprises establishing a stream of a heated inert carrier gas through an elongated partition column packed with solid particles at an elevated temperature, said particles having a surface coating of a partition liquid comprising a molten mixture of a plurality of nonvolatile inorganic metal salts, said molten mixture being unreactive with the constituents of the mixture being separated, injecting said sample mixture into the stream of carrier gas entering said column, and detecting the appearance of the volatilized constituents of said sample mixture in the effluent from said column.

3. The method of claim 2 in which said partition liquid is a eutectic mixture of metal chlorides.

4. A packing material adapted for use as the stationary phase in the analysis by partition gas chromatography of a mixture of volatile inorganic compopunds, said packing material comprising granules of an inert solid material coated with a eutectic mixture of a plurality of nonvolatile inorganic metal salts, which mixture of nonvolatile salts in its molten condition is unreactive with the components of the mixture to be analyzed.

5. The material of claim 4 in which said mixture of nonvolatile salts comprises from about 20% to about 70% by weight of the total composition.

6. A packing material adapted for use as the stationary phase in the analysis by partition gas chromatography of a mixture of volatile inorganic compounds, said packing material comprising granules of an inert solid material coated with a mixture of a plurality of nonvolatile inorganic metal halides, which mixture of nonvolatile halides in its molten condition is unreactive with the components of the mixture to be analyzed.

7. A packing material adapted for use as the stationary phase in the analysis by partition gas chromatography of a mixture of volatile inorganic compounds, said packing material comprising granules of an inert solid material coated with a mixture of a plurality of nonvolatile inorganic metal chlorides, which mixture of nonvolatile chlorides in its molten condition is unreactive with the components of the mixture to be analyzed.

References Cited in the file of this patent

Article: "Gas Chromatography Instrumentation for the Laboratory" by C. Phillips, published in Gas Chromatography, by Coates (Academic Press Inc., N.Y.C.) 1958 of Papers from Gas Chromatography Symposium, August 1957. Copy in Div. 36.

UNITED STATES PATENT OFFICE
CERTIFICATE OF CORRECTION

Patent No. 3,048,029                                      August 7, 1962

Richard S. Juvet, Jr., et al.

It is hereby certified that error appears in the above numbered patent requiring correction and that the said Letters Patent should read as corrected below.

Column 2, in the table, first column, line 8 thereof, for "$CdBr_3/KBr$" read -- $CdBr_2/KBr$ --; column 3, line 11, after "must" insert -- be --; line 72, for "introduces" read -- introduced --; column 4, line 59, for "constiuents" read -- constituents --; column 5, line 3, after "molten" insert -- eutectic --; line 13, for "compopunds" read -- compounds --.

Signed and sealed this 27th day of November 1962.

(SEAL)
Attest:
ESTON G. JOHNSON
Attesting Officer

DAVID L. LADD
Commissioner of Patents